(12) United States Patent
Mittal et al.

(10) Patent No.: US 10,949,707 B2
(45) Date of Patent: Mar. 16, 2021

(54) METHOD, APPARATUS, AND SYSTEM FOR GENERATING FEATURE CORRESPONDENCE FROM CAMERA GEOMETRY

(71) Applicant: HERE GLOBAL B.V., Eindhoven (NL)

(72) Inventors: Anish Mittal, San Francisco, CA (US); David Lawlor, Chicago, IL (US); Krishna Balakrishnan, Chicago, IL (US); Zhanwei Chen, Richmond, CA (US)

(73) Assignee: HERE Global B.V., Eindhoven (NL)

( * ) Notice: Subject to any disclaimer, the term of this patent is extended or adjusted under 35 U.S.C. 154(b) by 63 days.

(21) Appl. No.: 16/287,732

(22) Filed: Feb. 27, 2019

(65) Prior Publication Data
US 2020/0272847 A1 Aug. 27, 2020

(51) Int. Cl.
*G06K 9/00* (2006.01)
*G06K 9/62* (2006.01)
(Continued)

(52) U.S. Cl.
CPC ....... *G06K 9/6202* (2013.01); *G01C 21/3602* (2013.01); *G06T 7/60* (2013.01);
(Continued)

(58) Field of Classification Search
CPC ............. G06T 2207/30244; G06T 7/73; G06T 2207/10016; G06T 7/246; G06T 7/55;
(Continued)

(56) References Cited

U.S. PATENT DOCUMENTS 7,873,207 B2 * 1/2011 Tsubaki ............... H04N 13/282
  382/154
8,379,929 B2 * 2/2013 Sharp ........................ G06T 7/70
  382/106
(Continued)

OTHER PUBLICATIONS

Schinstok et al., "An Alternative Cost Function to Bundle Adjustment Used for Aerial Photography From UAVs", Apr. 2009, 8 pages.
(Continued)

*Primary Examiner* — Ian L Lemieux
(74) *Attorney, Agent, or Firm* — Ditthavong & Steiner, P.C.

(57) ABSTRACT

An approach is provided for determining a feature correspondence based on camera geometry. The approach, for example, involves determining a first labeled or detected pixel location in a first image and a second labeled or detected pixel location in a second image. The approach also involves computing a first ray from a first camera position of the first image through the first labeled or detected pixel location. The approach further involves computing a second ray from a second camera position of the second image through the second labeled or detected pixel location. The approach further involves computing a closeness value of the first ray and the second ray. The approach further involves providing an output indicating the feature correspondence between the first labeled or detected pixel location and the second labeled or detected pixel location based on determining that the closeness value is within a threshold value.

20 Claims, 10 Drawing Sheets

(51) Int. Cl.
G06T 7/73 (2017.01)
G06T 7/60 (2017.01)
G01C 21/36 (2006.01)

(52) U.S. Cl.
CPC ...... *G06T 7/73* (2017.01); *G06T 2207/10032* (2013.01); *G06T 2207/30244* (2013.01); *G06T 2207/30252* (2013.01)

(58) Field of Classification Search
CPC .. G06T 7/60; G06T 7/74; G06T 15/20; G06T 7/2033; G06T 7/593; G06T 2207/10032; G06T 2207/30252; G01B 11/002; G01B 11/26; G06K 9/6202; G01C 21/3602
See application file for complete search history.

(56) References Cited

U.S. PATENT DOCUMENTS

| | | | | |
|---|---|---|---|---|
| 8,483,442 | B2* | 7/2013 | Takiguchi | G01C 21/3602 382/106 |
| 8,577,604 | B1* | 11/2013 | Ogale | G01C 21/32 382/190 |
| 9,196,054 | B2 | 11/2015 | Yous et al. | |
| 10,331,972 | B2* | 6/2019 | Sasaki | G06T 7/248 |
| 10,600,202 | B2* | 3/2020 | Ikeda | G01B 11/26 |
| 2011/0216935 | A1* | 9/2011 | Mays | G06K 9/46 382/100 |
| 2011/0228975 | A1* | 9/2011 | Hennessey | G06K 9/00624 382/103 |
| 2012/0033077 | A1* | 2/2012 | Kitaura | G06T 7/55 348/148 |
| 2015/0163477 | A1* | 6/2015 | Klingner | G06T 7/593 348/47 |
| 2015/0206023 | A1* | 7/2015 | Kochi | G06T 15/20 382/199 |
| 2016/0063341 | A1* | 3/2016 | Ogata | G06K 9/00791 382/103 |
| 2016/0093058 | A1* | 3/2016 | Moteki | G06K 9/4604 382/154 |
| 2016/0292533 | A1* | 10/2016 | Uchiyama | H04N 13/366 |
| 2018/0114339 | A1 | 4/2018 | Ikeda et al. | |
| 2018/0180740 | A1* | 6/2018 | Shaffer | G01S 17/06 |
| 2020/0082564 | A1* | 3/2020 | Kaczor | G06T 7/74 |
| 2020/0090366 | A1* | 3/2020 | Korjus | G01S 13/867 |
| 2020/0134871 | A1* | 4/2020 | Hayakawa | G06T 7/70 |

OTHER PUBLICATIONS

Slabaugh et al., "Optimal Ray Intersection for Computing 3D Points From N-view Correspondences", Oct. 2, 2001, pp. 1-11.

Scharstein et al., "A Taxonomy and Evaluation of Dense Two-Frame Stereo Correspondence Algorithms", Technical Report, Nov. 2001, 61 pages.

* cited by examiner

METHOD, APPARATUS, AND SYSTEM FOR GENERATING FEATURE CORRESPONDENCE FROM CAMERA GEOMETRY

BACKGROUND

Modern location-based services and applications (e.g., autonomous driving) are increasingly demanding highly accurate and detailed digital map data (e.g., centimeter-level accuracy or better) across wide geographic areas. To achieve such levels of coverage, map service providers have relied on data (e.g., imagery) collected from a variety of sources with different views or perspectives (e.g., top down imagery from aerial cameras, and ground-level imagery for surface vehicles, etc.). Map service providers can then, for instance, identify common semantic features (e.g., lane markings, signs, etc.) across the image views for map making, localization, and/or other similar location-based services. However, identifying features and then relating them as the same feature across image views (i.e., image or feature correspondence) presents significant technical hurdles because of the amount of data that has to be processed due, for instance, to differences in the scales of the images across different image views.

Some Example Embodiments

Therefore, there is a need for an approach for generating feature correspondence between image views or perspectives.

According to one embodiment, a computer-implemented method for determining a feature correspondence between a first image and a second image based on camera geometry comprises determining a first labeled or detected pixel location in the first image and a second labeled or detected pixel location in the second image. The method also comprises computing a first ray from a first camera position of the first image through the first labeled or detected pixel location. The method further comprises computing a second ray from a second camera position of the second image through the second labeled or detected pixel location. The method further comprises computing a closeness value of the first ray and the second ray. The method further comprises providing an output indicating the feature correspondence between the first labeled or detected pixel location and the second labeled or detected pixel location based on determining that the closeness value is within a threshold value.

According to another embodiment, an apparatus for determining a feature correspondence between a first image and a second image based on camera geometry comprises at least one processor, and at least one memory including computer program code for one or more computer programs, the at least one memory and the computer program code configured to, with the at least one processor, cause, at least in part, the apparatus to determine a first labeled or detected pixel location in the first image and a second labeled or detected pixel location in the second image. The apparatus is also caused to compute a first ray from a first camera position of the first image through the first labeled or detected pixel location. The apparatus is further caused to compute a second ray from a second camera position of the second image through the second labeled or detected pixel location. The apparatus is further caused to compute a closeness value of the first ray and the second ray. The apparatus is further caused to provide an output indicating the feature correspondence between the first labeled or detected pixel location and the second labeled or detected pixel location based on determining that the closeness value is within a threshold value.

According to another embodiment, a non-transitory computer-readable storage medium for determining a feature correspondence between a first image and a second image based on camera geometry carries one or more sequences of one or more instructions which, when executed by one or more processors, cause, at least in part, an apparatus to determine a first labeled or detected pixel location in the first image and a second labeled or detected pixel location in the second image. The apparatus is also caused to compute a first ray from a first camera position of the first image through the first labeled or detected pixel location. The apparatus is further caused to compute a second ray from a second camera position of the second image through the second labeled or detected pixel location. The apparatus is further caused to compute a closeness value of the first ray and the second ray. The apparatus is further caused to provide an output indicating the feature correspondence between the first labeled or detected pixel location and the second labeled or detected pixel location based on determining that the closeness value is within a threshold value.

According to another embodiment, an apparatus for determining a feature correspondence between a first image and a second image based on camera geometry comprises means for determining a first labeled or detected pixel location in the first image and a second labeled or detected pixel location in the second image. The apparatus also comprises means for computing a first ray from a first camera position of the first image through the first labeled or detected pixel location. The apparatus further comprises means for computing a second ray from a second camera position of the second image through the second labeled or detected pixel location. The apparatus further comprises means for computing a closeness value of the first ray and the second ray. The apparatus further comprises means for providing an output indicating the feature correspondence between the first labeled or detected pixel location and the second labeled or detected pixel location based on determining that the closeness value is within a threshold value.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for determining feature correspondence between images based on camera geometry are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
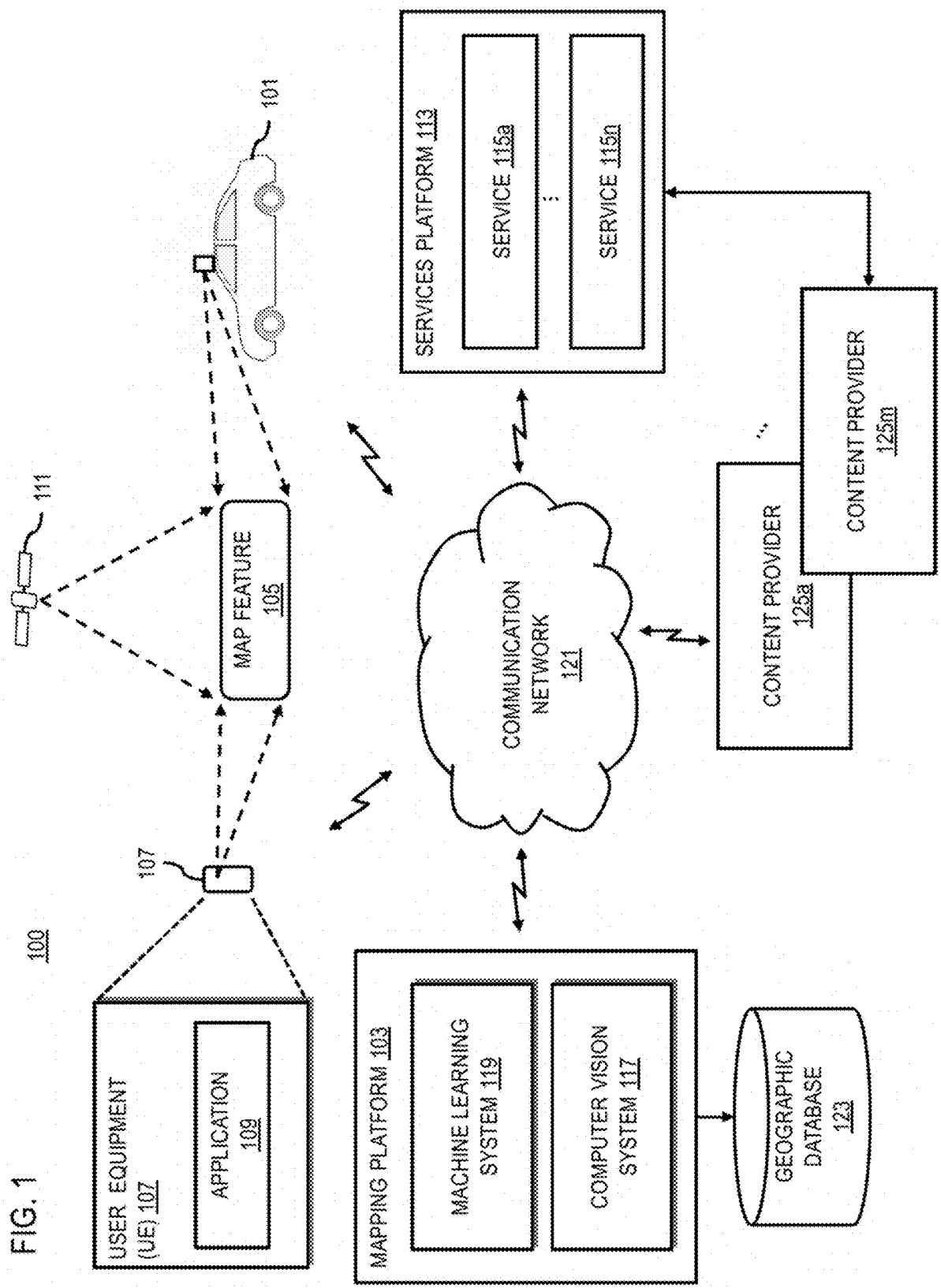
FIG. 1 is a diagram of a system capable of generating feature correspondence between different images, according to one embodiment.

FIG. 1 is a diagram of a system capable of generating feature correspondence between different images, according to one embodiment. In one embodiment, image or feature correspondence refers to estimating which parts in one image corresponds to which parts in another image with the assumption that they are looking at the same scene or at least have some portion or the fields of view overlapping. Typically, the fields of view and/or scenes of the different images will have at least some differences. The differences in the images, for instance, could be due to different times of capture leading to different lighting and illumination, different vantage points/perspective/camera orientation, etc. Although the various embodiments are described with respect to correspondence between two images, the correspondence problem can be generalized to more than two images.

Image correspondences is one of the most foundational problems in computer vision and finds applications in triangulation of features for map making, real-time sensing of the environment provides information about potential obstacles, the behavior of others on the road, and safe, drivable areas, motion and depth estimation, panorama creation, image stitching, etc. In all of the above use cases, it is important to have correspondences in order to calculate the unique real-world coordinates of the features involved or to find the geometric transformation of one image to the other. In short, correspondence estimation is a centerpiece of creating a three-dimensional representation of the world using camera sensors.

For example, many location-based services and applications rely on accurate map data. In one use case, automated driving is quickly becoming a reality following advances in machine learning, computer vision, and compute power. The ability to perceive the world with an accurate semantic understanding enables vehicles (e.g., an autonomous vehicle 101) to obey driving rules and avoid collisions. As these perceptual abilities have improved, so too has the need for highly accurate and up-to-date maps. Path planning, for instance, requires knowledge of what to expect beyond a vehicle 101's perceptual horizon, and driving in complicated urban environments with many occluding objects requires a knowledge of what cannot be detected by onboard sensors.

In response, map service providers (e.g., operating a mapping platform 103) are creating the most accurate and up-to-date high-resolution map. In addition to autonomous driving, digital maps in the form of models of the environment are needed for a wide range of automated applications including transportation, guidance, and search and rescue. Learning and automating the map creation and update has therefore been a major research focus in the robotics and artificial intelligence (AI) community in the last decades.

Different sources of raw data (e.g., image data) can be exploited to make a map. For example, top down sources, like satellite, aerial and drone images, which are accurate photographs of the Earth's surface from a top down perspective, can be used to precisely determine the location of roads, and other features (e.g., map feature 105) on the Earth. These images help create maps at a much larger scale but are more limited to surface features.

Ground sources like cars, robots, and/or mobiles devices (e.g., user equipment, UE, 107) are also exploited to acquire an accurate model of their environment using sensing systems like cameras and running perception algorithms on the acquired data (e.g., by executing an application 109). Processing ground sources generally requires more effort and resources to do a larger scale city level collection, but the resulting images can be used to detect features (e.g., map feature 105) that are above the ground as well like traffic lights, signs etc. which may not be visible from a top down image or source. Therefore, mapping a more complete set of features in an area may often require using both top down and ground level sources.

Since both top down and ground level imagery are georeferenced (e.g., have camera positions associated with them), the map features detected from the imagery will also have associated 3D positions and hence can be utilized for the map making process. In one embodiment, Feature correspondences across different sources enables aggregating maps made from different sources for better accuracy and more completeness. They could also help with the correction of one source using the other, depending on the relative correctness of the sources.

However, determining feature correspondences between different images and/or images from different sources can be technically challenging. For example, with respect to determining feature correspondence between a top down image source (e.g., top down imagery from a satellite 111 or any other aerial source) versus ground level imagery from ground level sources (e.g., a vehicle 101, robot, or other ground level devices such as UE 107), there are least several technical challenges. For example, these technical challenges include but are not limited to automatically detecting and identifying common features (e.g., tie points) for determining feature correspondence. More specifically, these challenges related to determining that features selected for image correspondence should be criteria such as but not limited to:

(1) Should be visible in images that are to be analyzed for feature correspondence (e.g., visible from both top down and ground level views, or multiple views from the same source);
(2) Should not change very frequently; and
(3) Should be uniquely identifiable from their surroundings.

In particular, item 1 above relating to determining a photo-identifiable feature is visible in both images being compared can be technically difficult or computer resource intensive using traditional processes. For example, even though a feature may be uniquely identifiable from its surroundings, computer visions systems may still have difficulty determining that the identified feature is the same between different images.

To address these problems, the system 100 of FIG. 1 introduces a capability to find feature correspondences in images by using ray intersection based on the geometry of the cameras used to capture the images. In one embodiment, the camera geometry includes data on camera position (e.g., locations of the camera when the corresponding images were capture), camera pose information (e.g., pointing direction), camera technical parameters (e.g., field of view, focal length, camera lens used, etc.). The system 100 can then use the camera geometry to determine the position of the image planes of the images. The image planes, for instance, represent the location of the camera's fields of view in three-dimensional space, thereby enabling the system 100 to determine the relative orientation of the images with respect to each other. The system 100 then generates rays from the respective camera positions through the locations of features in the image planes. The system 100 can then use the closeness of the intersection of the rays from two different images to determine whether the features that are visible in the images are the same features. If the rays between two images are within a threshold closeness, the system 100 determines that the depicted features corresponding to the rays in each image are the same, thereby indicating a feature correspondence between the images (e.g., two or more images) being compared. Embodiments of the ray intersection technical solution described herein can be very computationally simple, and easy to implement based on pure geometry. This, in turn, enables the system 100 advantageously reduce the computing resources (e.g., processing power, memory, bandwidth, etc.) used for determining feature correspondence relative to conventional processes.

Figure 2:
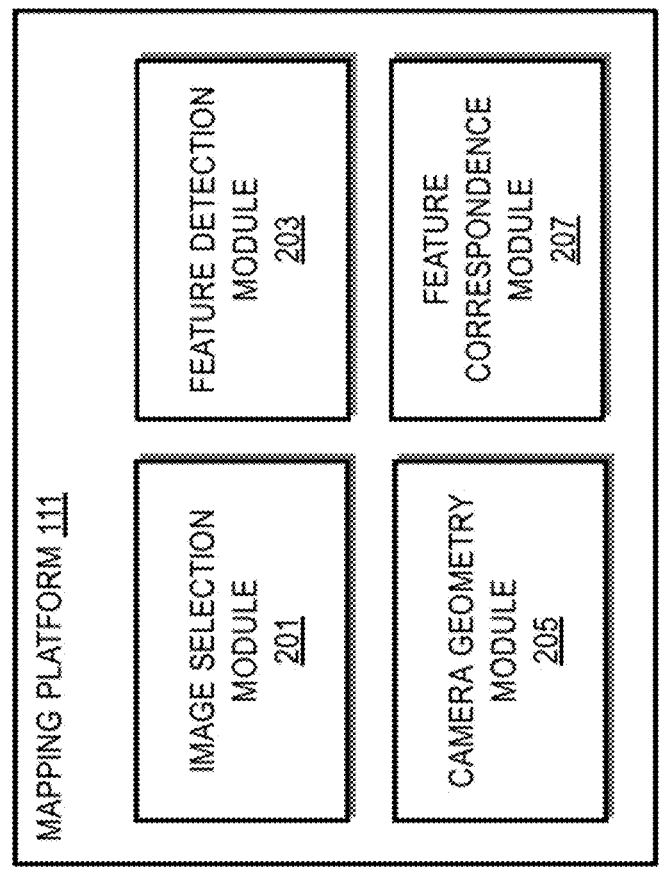
FIG. 2 is a diagram of components of a mapping platform capable of generating feature correspondence between different image, according to one embodiment.

In one embodiment, as shown in FIG. 2, the mapping platform 103 includes one or more components for generating feature correspondence between image sources based on camera geometry, according to the various embodiments described herein. It is contemplated that the functions of these components may be combined or performed by other components of equivalent functionality. In this embodiment, the mapping platform 103 includes an image selection module 201, feature detection module 203, camera geometry module 205, and a feature correspondence module 207. The above presented modules and components of the mapping platform 103 can be implemented in hardware, firmware, software, or a combination thereof. Though depicted as a separate entity in FIG. 1, it is contemplated that the mapping platform 103 may be implemented as a module of any other component of the system 100 (e.g., a component of the services platform 113, services 115a-115n (also collectively referred to as services 115), vehicle 101, UE 107, application 109 executing on the UE 107, etc.). In another embodiment, one or more of the modules 201-207 may be implemented as a cloud-based service, local service, native application, or combination thereof. The functions of the mapping platform 103 and the modules 201-207 are discussed with respect to FIGS. 3-6 below.

Figure 3:
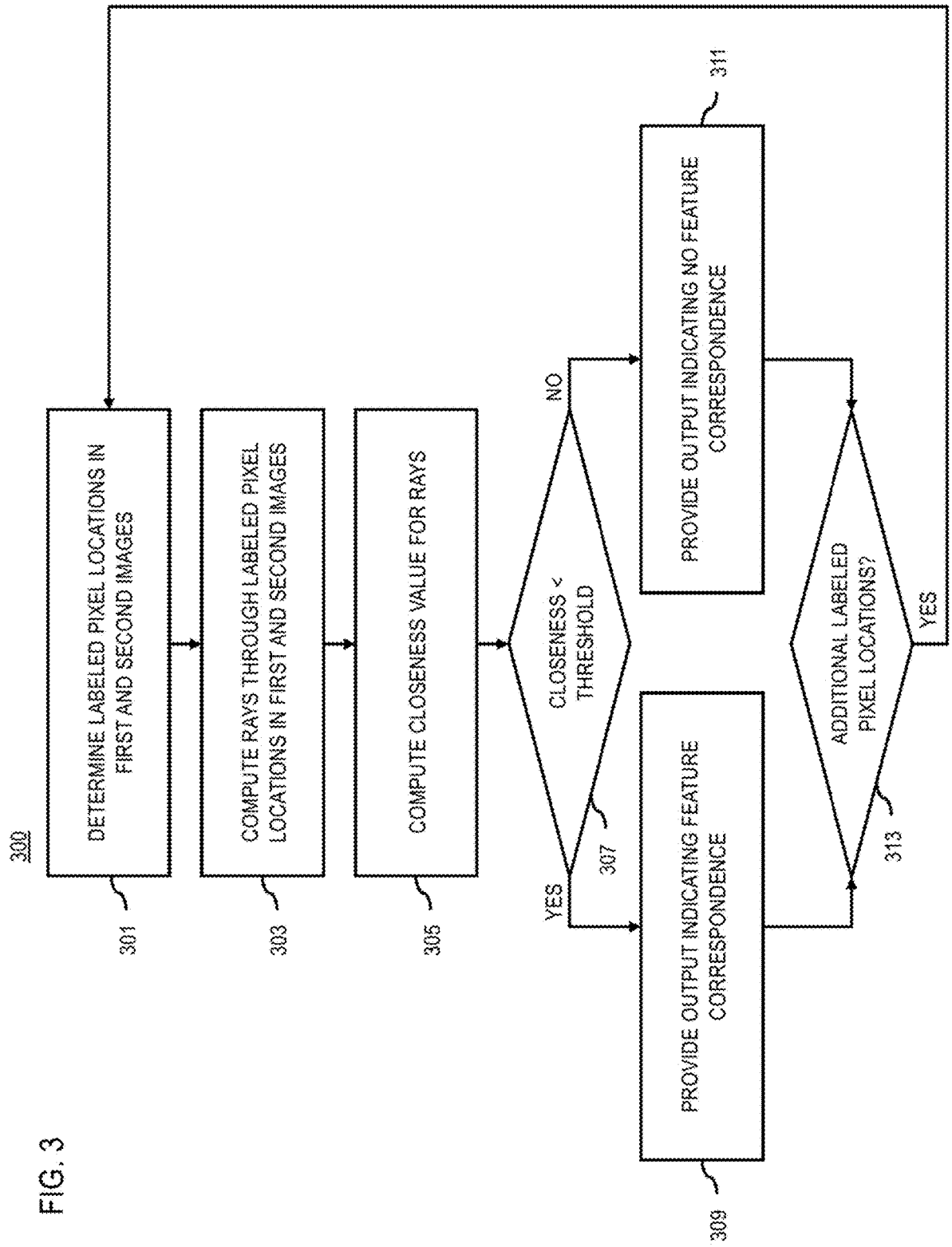
FIG. 3 is a flowchart of a process for generating feature correspondence based on camera geometry, according to one embodiment.
Figure 9:
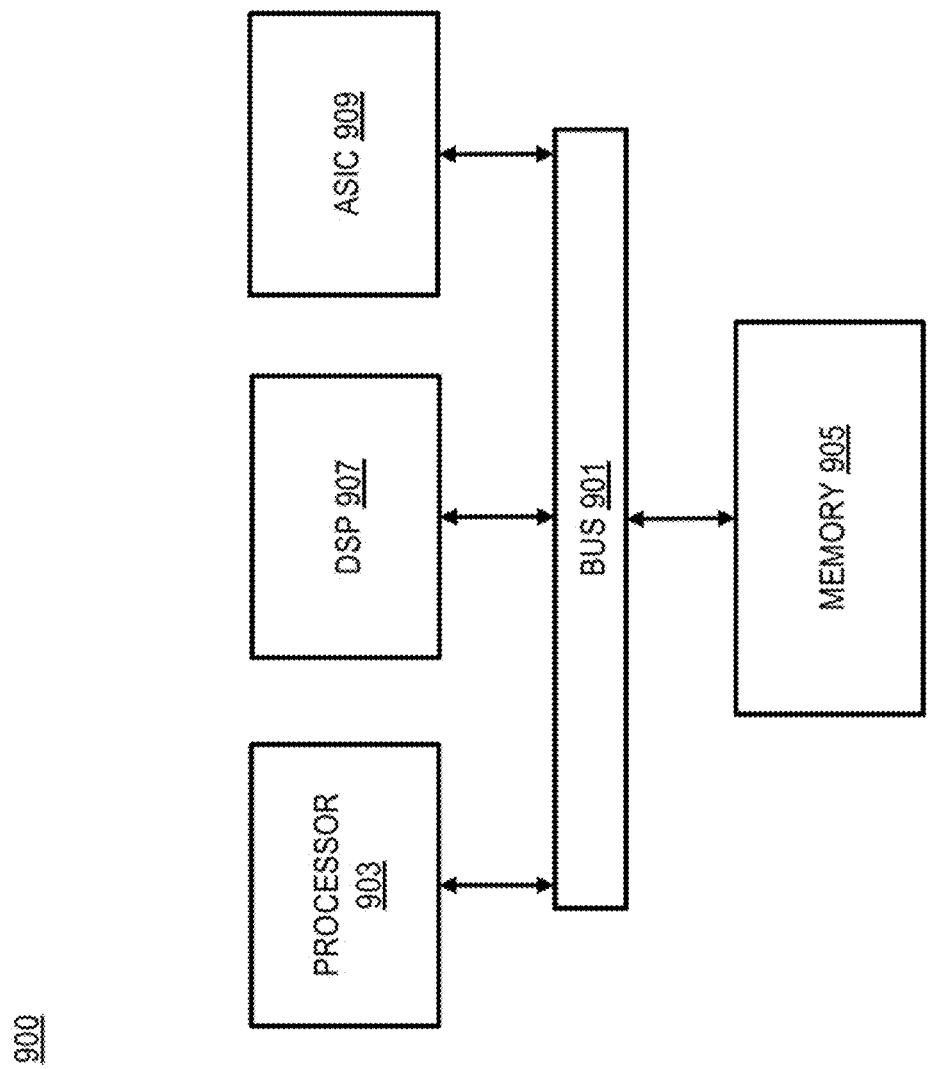
FIG. 9 is a diagram of a chip set that can be used to implement an embodiment.

FIG. 3 is a flowchart of a process for generating feature correspondence based on camera geometry, according to one embodiment. In various embodiments, the mapping platform 103 and/or any of the modules 201-207 may perform one or more portions of the process 300 and may be implemented in, for instance, a chip set including a processor and a memory as shown in FIG. 9. As such, the mapping platform 103 and/or the modules 201-207 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all of the illustrated steps.

In one embodiment, the operation of the process 300 can be summarized as follows:

For each image of the pair (step 301), collect the ray that passes through both a labeled or detected pixel location (corresponding to a feature of interest) and the camera center (associated with the image). (Step 303).

For each ray in the first image, compute the closest ray collected from the other image in the pair. Closeness between two rays is defined by computing the length of the segment that is orthogonal to the ray pair. (Step 305).

If the closest ray is less than a certain threshold value apart (step 307), consider it as a match (step 309) but a non-match otherwise (step 311).

In one embodiment, the pixels that correspond to the rays are provided as the output indicating the correspondences. In another embodiment, the midpoint of the segment (that is orthogonal to the pair) is reported as the 3D triangulated position.

Stop the procedure if ray set becomes empty in any of the sets (step 313).

Report the remaining pixels as stray or having no correspondences.

Embodiments of the process 300 is described below with respect to the examples of FIGS. 4 and 5.

In step 301, the image selection module 201 interacts with the feature detection module 203 to determine a first labeled or detected pixel location in the first image and a second labeled or detected pixel location in the second image. By way of example, a labeled pixel is a pixel annotated by a labeler (e.g., a human labeler) as corresponding to a feature of interest, and a detected pixel is a pixel determined by a computer system (e.g., computer vision system using machine learning) to be classified as corresponding to a feature of interest. In other words, the image selection module 201 first selects any two or more images that are to be analyzed for feature correspondence. By way of example, the images can be from different sources (e.g., top-down source, ground-level source, etc.) or different images taken from the same source (e.g., images taken at different times of the day, different perspectives, etc.).

Figure 4:
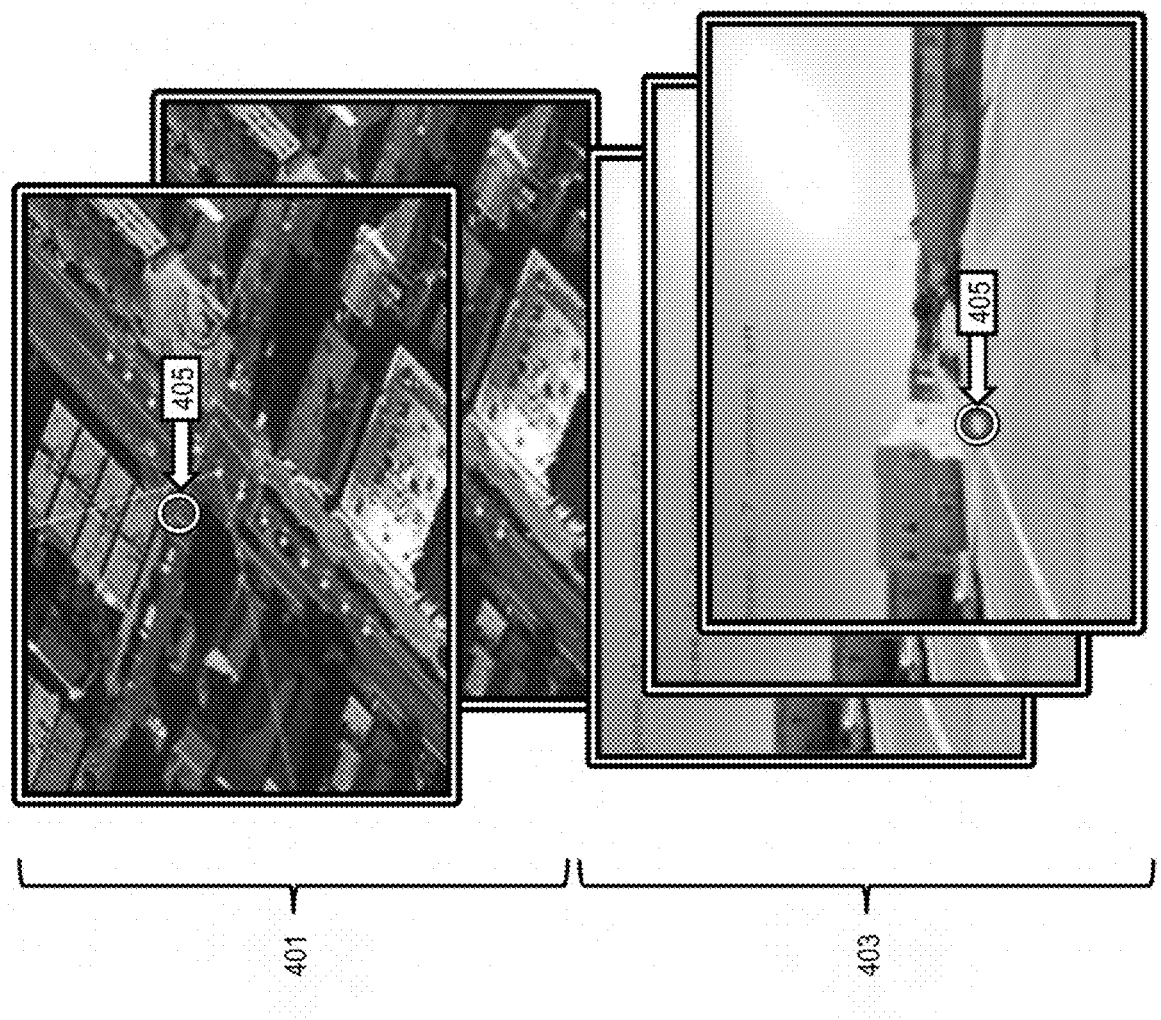
FIG. 4 is a diagram illustrating example image data from different sources depicting the same feature, according to one embodiment.

FIG. 4 illustrates examples of a set of top down images 401 from a first source (e.g., an aerial or top source such as a satellite 111) and a set of ground level images 403 from a second source (e.g., a ground level source such as a camera mounted on a vehicle 101, UE 107, robot, or other system traveling on the ground). In this example, the top down images 401 and ground level images 403 depict the same map or semantic feature 405 (e.g., a crosswalk corner formed by the joining of two lines of a crosswalk painted in an intersection). By way of example, top-down imagery refers to images or image data that are captured from an overhead or aerial perspective (e.g., from a drone, satellite, and/or the like) so that the camera is pointed down towards the intersection or ground level from an overhead height. Ground-level imagery refers to images or image data captured while the camera is located at ground level or mounted on a vehicle or system that is located at ground level with the camera pointed towards the feature or object being captured (e.g., a dash cam or equivalent).

In one embodiment, the selected images can be labeled with features that are photo-identifiable in the images, of otherwise have detected features. Labeling, for instance, refers to identifying pixels or groups of pixels in the images that correspond to a feature of interest, typically but not necessarily by a human. In addition or alternatively, the pixels of the selected images can be detected by automated machine processes. For example, the feature detection module 203 can detect any map feature that is visible in both top down and ground level imagery (or imagery from any perspectives or views of interest). The feature detection module 205 can use, for instance, a computer vision system 117 in combination with a machine learning system 119 (e.g., a neural network or equivalent) to recognize the pixels of the images that correspond to the visible feature. For example, the identified feature or features can include but are not limited to intersection-related features which are generally visible in both top down and ground level images. While any type of visible or photo-identifiable features can be used according to the embodiments described herein, intersection-related features (e.g., curvilinear geometry intersection features) are particularly suited for automated identification (e.g., via the computer vision system 117) because they exhibit the following properties: (1) have a consistent definition, (2) are uniquely identifiable, (3) have spatial sparsity, and/or (4) are generalizable across different geographic regions.

In other embodiments, the feature can be ground control points that are identifiable points on the Earth's surface that have precise location (e.g., in the form of <Latitude, Longitude, Elevation>) associated with them. These ground control points, for instance, can be collected by ground surveyors who go out in the field and use instruments like a theodolite, measuring tape, three-dimensional (3D) scanner, satellite-based location sensors (e.g., GPS/GNSS), level and rod, etc. to measure the locations of ground control points with high accuracy.

After the feature detection process, the feature detection module 203 outputs data indicating the locations of the pixels that correspond to detected features of interest. The pixel locations, for instance, can be expressed as pixel coordinates within each respective pair or set of images being compared or equivalent.

In step 303, for each image of the pair or set, the camera geometry module 205 computing a first ray from a first camera position of the first image through the first labeled or detected pixel location, and a second ray from a second camera position of the second image through the second labeled or detected pixel location. In one embodiment, the camera geometry module 205 determines the camera position and pose for image of the pair (e.g., extracted from image meta data or other data store indicating camera geometry data for the images of interest), and to locate the respective cameras in a common coordinate system (e.g., a global or real-world coordinate system indicating <latitude, longitude, altitude> of each camera. The camera geometry module 205 can then use camera pose data (e.g., pointing direction of the camera) and/or camera technical specifications (e.g., focal length, camera lens, aperture, exposure, etc.) to locate the image plane within the same common coordinate system. The image plane refers to the apparent location in three-dimensional space of the image, thereby enabling the camera geometry module 205 to translate each pixel location (including feature-labeled or detected pixel locations) in the respective images into the common coordinate system (e.g., real-world location given by <latitude, longitude, altitude> or equivalent).

In one embodiment, the camera geometry module 205 can generate a ray (e.g., a line or line segment) from each the camera position (e.g., expressed in real-world coordinates or coordinates common to the pictures being analyzed) to the determined location of each feature-labeled or detected pixel (e.g., also expressed in real-world coordinates or coordinates common to the pictures being analyzed). A set of rays are then computed or calculated for each image.

In step 305, the feature correspondence module 207 computes closeness values between the rays of the first image and the rays of the second image. For example, if a first ray is generated for a first labeled or detected pixel location in the first image and a second ray is generated for a second labeled or detected pixel in the second image, the feature correspondence module 207 computes a closeness value of the first ray and the second ray. In one embodiment, the closeness value can be any metric to indicate how close any two rays are to each other. For example, the feature correspondence module 207 can compute a length of a line segment (e.g., a shortest line segment) between the first ray and the second ray. The length of the line segment can then be used to represent or otherwise derive the closeness value. In one embodiment, the line segment can be determined so that it is orthogonal (e.g., form 90° angles) to both rays being compared.

In step 307, the feature correspondence module 207 can then compare the closeness value to a threshold value to determine whether there is a correspondence. The threshold value can be a threshold distance or any other metric/criterion developed based on application requirements with respect to accuracy and recall. For example, if the closeness value indicates that a pair of rays are within the threshold value of each other, then the feature correspondence module 207 can determine there is a match between the two features corresponding to the rays (step 309), otherwise a match or correspondence is not determined (step 311). In one embodiment, when a match is determined, the labeled or detected pixel locations for the matching features in each of the images in the pair or set being analyzed can be output as the correspondences or to otherwise indicate the correspondences. In other words, the feature correspondence module 207 provides an output indicating the feature correspondence between the first labeled or detected pixel location and the second labeled or detected pixel location based on determining that the closeness value is within a threshold value. Alternatively, the feature correspondence module 207 provides an output indicating that first labeled or detected pixel location, the second labeled or detected pixel location, or a combination thereof has no correspondence based on determining that the closeness value exceeds the threshold value.

In one embodiment, if there is more than one possible ray in one image to match against rays in another image, the feature correspondence module 207 can select one ray from a first image and then compute the closeness values for that ray against all other rays in the second image. The ray that has the minimum closeness value can be selected as the best candidate ray. The minimum closeness value of the selected candidate ray can then be evaluated against the threshold value to determine whether there is match or correspondence.

In step 313, when there are multiple rays for the images being compared, the feature correspondence module 207 can initiate an iterative computation of subsequent closeness values between each subsequent ray pair computed between each subsequent labeled or detected pixel location in the first image and each subsequent labeled or detected pixel location in the second image to determine possible correspondences. The feature correspondence module 207 can stop the iterative computation when a ray set and/or any set of labeled or detected pixel locations of any one of the images becomes empty. In one embodiment, the feature correspondence module 207 can report any remaining pixels (e.g., pixels for which no correspondence has been determined or evaluated) in any of the images being analyzed as stray pixels or as having no correspondences.

Figure 5:
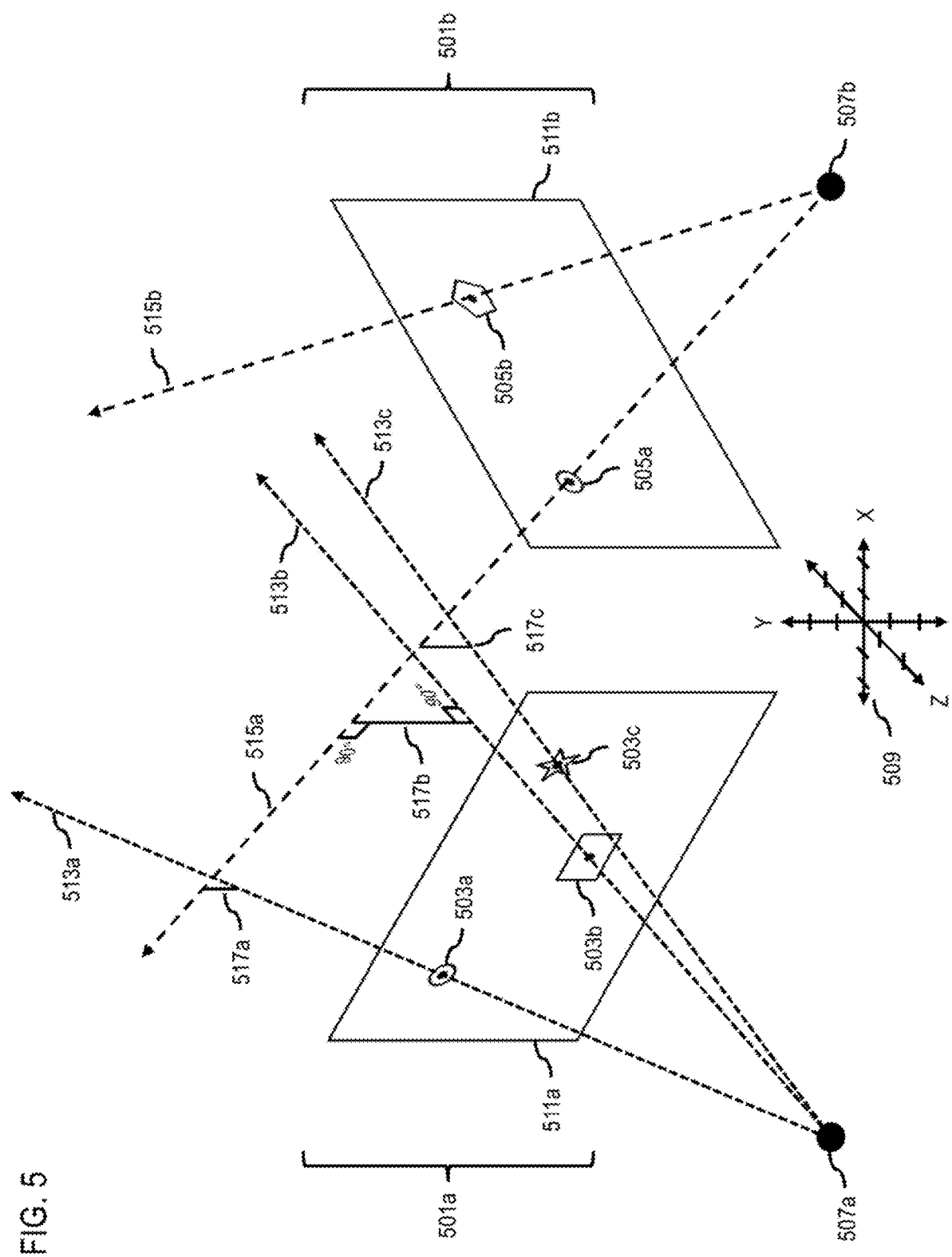
FIG. 5 is a diagram illustrating an example of projecting rays to determine feature correspondence based on camera geometry, according to one embodiment.

FIG. 5 is a diagram illustrating an example of projecting rays to determine feature correspondence based on camera geometry, according to one embodiment. As shown in the example of FIG. 5, images 501a and 501b are being processed to determine feature correspondence. Image 501a is labeled with features detected at pixel locations 503a, 503b, and 503c; and image 501b is labeled with features detected at pixel locations 505a and 505b. The mapping platform 103 determines camera geometry parameters associated with the images 501a and 501b to determines their respective camera locations 507a (e.g., corresponding to image 501a) and 507b (e.g., corresponding to image 501b) with respect to a common or global coordinate system 509. The mapping platform 103 also uses the camera geometry parameters to determine image planes 511a (e.g., corresponding to image 501a) and 511b (e.g., corresponding to image 501b) which represent the locations and orientations of the images 501a and 501b with respect to the coordinate system 509.

Then, for each of the labeled or detected pixel locations 503a-503c of the image 501a, the mapping platform 103 generates respective rays 513a-513c originating from the camera position 507a through each of the labeled or detected pixel locations 503a-503c. Similarly, for each of the labeled or detected pixel locations 505a and 505b of the image 501b, the mapping platform 103 generates respective rays 515a and 515b originating from the camera position 507b through each of the labeled or detected pixel locations 505a and 505b. To determine feature correspondence, the mapping platform can iteratively evaluate the closeness between the rays of each image 501a and 501b. For example, ray 515a of image 501b crosses over rays 513a-513c. To determine the closeness values for these rays, the mapping platform 103 computes a line segment 517a between rays 513a and 515a, line segment 517b between rays 513b and 515a, and line segment 517c between rays 513c and 515a. As shown in FIG. 5 with respect to line segment 517b, each of the line segments 517a-517c are drawn so that they are orthogonal to each of their respective ray pairs. In one embodiment, this orthogonality of the line segments 517a-517c helps to ensure that the line segments are the shortest or minimum between the rays.

The mapping platform 103 then determines the minimum line segment 517a-517c, which is line segment 517a corresponding to the intersection of rays 513a and 515a. The length of the line segment 517a represents the closeness value between rays 513a and 515a. The mapping platform 103 can then compare this closeness value (i.e., length of line segment 517a) to a threshold value. In this example, the length of the line segment 517a is less than then threshold value. As a result, the mapping platform 103 determines that feature point 503a (e.g., corresponding to ray 513a of image 501a) and feature point 505a (e.g., corresponding to ray 515a of image 501b) depict the same feature, thereby representing a feature correspondence between images 501a and 501b. The mapping platform 103 can output labeled or detected pixel location of 503a of image 501a and labeled or detected pixel location 505a of image 501b as a correspondence. Each of the remaining labeled or detected pixel locations in the images 501a and 501b can be similarly evaluated for correspondences. In this example, the only correspondence is between pixel locations 503a and 505a. Pixel locations 503b and 503c of image 501a do not match any rays 515a and 515b of image 501b with the threshold value, and therefore are determined as being visible in image 501a but not in image 501b. Similarly, pixel location 505b of image 501b does not match any rays 513a-513c with the threshold value, and there are determined as being visible in image 501b but not in image 501a.

Figure 6:
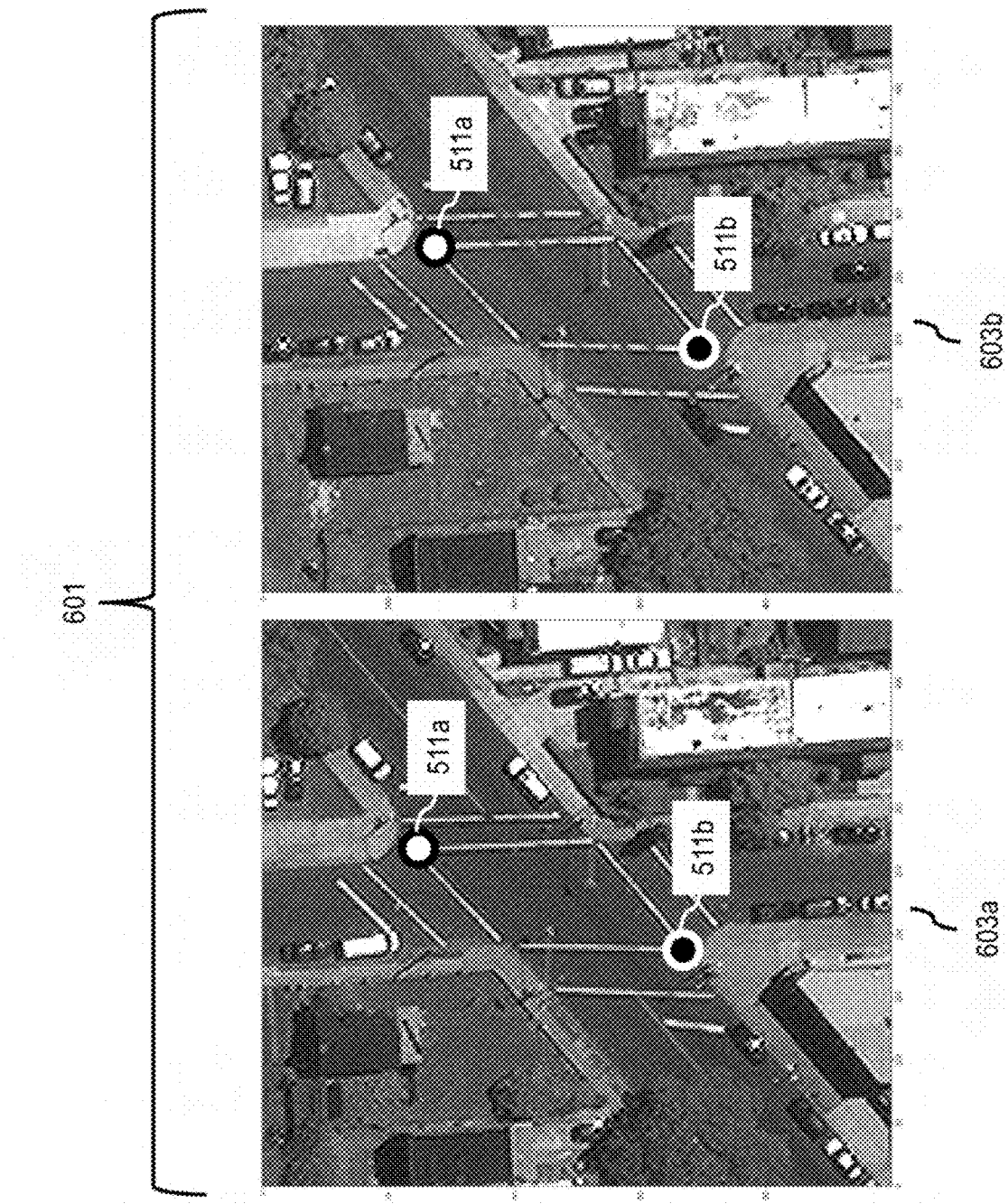
FIG. 6 is a diagram illustrating an example of determining feature correspondence based on camera geometry for two images, according to one embodiment.

FIG. 6 is a diagram illustrating an example of determining feature correspondence based on camera geometry for two images, according to one embodiment. More specifically, the mapping user interface 601 of FIG. 6 shows the correspondence between satellite images 603a and 603b as determined according to the embodiments described herein. In this example, the mapping platform 103 has evaluated labeled crosswalk intersection features 605a and 605b depicted in each of the images 603a and 603b and determined that they are feature correspondences between the images 603a and 603b (i.e., depict the same feature between two different images) based on the camera geometry parameters of the images 603a and 603b. The mapping platform 103 can then generate the user interface 601 as an output to indicate the feature correspondences 605a and 605b.

In addition or alternatively, for matched feature (e.g., intersection-related feature, etc.), the corresponding pixel coordinates in the images being compared can recorded, creating a pixel correspondence in the form $\{(u_1, v_1), (u_2, v_2), \ldots\}$ or equivalent. Here, u and v are pixel locations of the same physical object or feature depicted in the images (e.g., pixel locations along the x and y axis respectively of a pixel grid comprising the image), and the subscript indicates in which image the feature is labeled.

In one embodiment, the output (e.g., feature correspondences between different image views) of the embodiments can be used for any number applications including but not limited to location correction of different images sources (e.g., higher accuracy imagery or map feature locations can be transferred or used to correct the location data of lower accuracy imagery). Other applications for feature correspondence can include but is not limited to higher accuracy map making, autonomous driving, and/or other location-based services. For example, autonomous driving has quickly become an area of intense interest where machine learning in combination with computer vision systems can be used. One application of vision techniques using feature correspondence between different image views is localization of the vehicle 101 with respect to reference map features (e.g., reference locations with highly accurate known locations). This localization can used for instance to facilitate autonomous driving when the location accuracy is sufficiently high (e.g., submeter or better accuracy). In one embodiment, the system 100 (e.g., the mapping platform 103) can generate map features using the feature correspondences between different image views for higher accuracy localization according to the embodiments as described herein. For example, the feature correspondences generated according to the embodiments described herein can be used to location-correct map features that can then be used as reference markers by vehicles 101 to localize themselves.

Traditionally, most vehicle navigation systems have accomplished this localization using GPS, which generally provides a real-time location with a 95% confidence interval of 7.8 meters. However, in complicated urban environments, reflection of GPS signals can further increase this error, such that one's location may be off by as much as 30 meters. Given that the width of many lanes is 3-4 meters, this accuracy is not sufficient to properly localize a vehicle 101 (e.g., an autonomous vehicle) so that it can make safe route planning decisions. Other sensors, such as inertial measurement units (IMUs) can increase the accuracy of localization by taking into account vehicle movement, but these sensors tend to drift and still do not provide sufficient accuracy for localization.

In general, a localization accuracy of around 10 cm is needed for safe driving (e.g., autonomous driving) in many areas. One way to achieve this level of accuracy is to use visual odometry, in which features are detected from imagery. These features can then be matched to a database of known feature locations to determine one's location. By way of example, traditional feature-based localization that both detect features and localize against them generally rely on low-level features. However, low-level features typically used in these algorithms (e.g., Scale-Invariant Feature Transform (SIFT) or Oriented FAST and rotated BRIEF (ORB)) tend to be brittle and not persist in different environmental and lighting conditions. As a result, they often cannot be used to localize a vehicle on different days in different weather conditions. Aside from reproducibility, the ability to detect and store higher level features of different types (e.g., map features based on intersection features such as lane markings, lane lines, etc.) can provide better and more accurate localization.

A vehicle 101, for instance, can use computer vision to identify a known map feature (e.g., a crosswalk corner), and then estimate its distance to the detected feature (e.g., location corrected according to the embodiments described herein). Because the location of the detected has been corrected to high accuracy using the feature correspondences generated according to the embodiments described herein, the vehicle 101 can compute its distance to the feature to use as a distance offset to the known location to localize itself with a corresponding high degree of accuracy. Understanding one's location on a map enables planning of a route, both on fine and coarse scales. On a coarse scale, navigation maps allow vehicles 101 to know what roads to use to reach a particular destination. However, on a finer scale, maps allow vehicles 101 to know what lanes to be in and when to make lane changes. Knowing this information is important for planning an efficient and safe route, for in complicated driving situations maneuvers need to be executed in a timely fashion, and sometimes before they are visually obvious. In addition, localization with respect to ground control points enables the incorporation of other real-time information into route planning. Such information could include traffic, areas with unsafe driving conditions (ice, fog, potholes, e.g.), and temporary road changes like construction.

Returning to FIG. 1, as shown, the system 100 includes the mapping platform 103 for determining feature correspondence between images based on camera geometry according to the embodiments described herein. For example, with respect to autonomous, navigation, mapping, and/or other similar applications, the mapping platform 103 can detect features in input images to provide location correction of sources based on feature correspondence, according to the various embodiments described herein. In one embodiment, the machine learning system 119 of the mapping platform 103 includes a neural network or other machine learning system to make predictions from machine learning models. For example, when the input to the machine learning model are images used for the embodiments described herein, the output can include pixel locations of photo-identifiable features that can be used to determine feature correspondence between images based on camera geometry for location correction or other applications. In one embodiment, the neural network of the machine learning system 119 is a traditional convolutional neural network which consists of multiple layers of collections of one or more neurons (which are configured to process a portion of an input image. In one embodiment, the receptive fields of these collections of neurons (e.g., a receptive layer) can be configured to correspond to the area of an input image delineated by a respective a grid cell generated as described above.

In one embodiment, the machine learning system 119 and/or the computer vision system 117 also have connectivity or access over a communication network 121 to a geographic database 123 which stores the imagery for different sources (e.g., with different views or perspectives), extracted features, features correspondences, derived maps, etc. generated according to the embodiments described herein. In one embodiment, the geographic database 123 includes representations of features and/or other related geographic features determined from feature correspondences to facilitate visual odometry to increase localization accuracy. In one embodiment, the machine mapping platform 103 has connectivity over a communication network 121 to the services platform 113 that provides one or more services 115. By way of example, the services 115 may be third party services and include mapping services, navigation services, travel planning services, notification services, social networking services, content (e.g., audio, video, images, etc.) provisioning services, application services, storage services, contextual information determination services, location-based services, information based services (e.g., weather, news, etc.), etc. In one embodiment, the services 115 uses the output of the mapping platform 103 (e.g., location corrected images, features, etc.) to localize the vehicle 101 or UE 107 (e.g., a portable navigation device, smartphone, portable computer, tablet, etc.) and/or provide services 115 such as navigation, mapping, other location-based services, etc.

In one embodiment, the mapping platform 103 may be a platform with multiple interconnected components. The mapping platform 103 may include multiple servers, intelligent networking devices, computing devices, components and corresponding software for providing parametric representations of lane lines. In addition, it is noted that the mapping platform 103 may be a separate entity of the system 100, a part of the one or more services 115, a part of the services platform 113, or included within the UE 107 and/or vehicle 101.

In one embodiment, content providers 125a-125m (collectively referred to as content providers 125) may provide content or data (e.g., including geographic data, parametric representations of mapped features, etc.) to the geographic database 123, the mapping platform 103, the services platform 113, the services 115, the UE 107, the vehicle 101, and/or an application 109 executing on the UE 107. The content provided may be any type of content, such as map content, textual content, audio content, video content, image content, etc. In one embodiment, the content providers 125 may provide content that may aid in the detecting and classifying of lane lines and/or other features in image data and degerming feature correspondences. In one embodiment, the content providers 125 may also store content associated with the geographic database 123, mapping platform 103, machine learning system 119, computer vision system 117, services platform 113, services 115, UE 107, and/or vehicle 101. In another embodiment, the content providers 125 may manage access to a central repository of data, and offer a consistent, standard interface to data, such as a repository of the geographic database 123.

In one embodiment, the UE 107 and/or vehicle 101 may execute a software application 109 to capture image data or other observation data for determining feature correspondence or using feature correspondence according to the embodiments described herein. By way of example, the application 109 may also be any type of application that is executable on the UE 107 and/or vehicle 101, such as autonomous driving applications, mapping applications, location-based service applications, navigation applications, content provisioning services, camera/imaging application, media player applications, social networking applications, calendar applications, and the like. In one embodiment, the application 109 may act as a client for the mapping platform 103 and perform one or more functions associated with generating feature correspondence from different image views alone or in combination with the machine learning system 119.

By way of example, the UE 107 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 107 can support any type of interface to the user (such as "wearable" circuitry, etc.). In one embodiment, the UE 107 may be associated with the vehicle 101 or be a component part of the vehicle 101.

In one embodiment, the UE 107 and/or vehicle 101 are configured with various sensors for generating or collecting environmental image data (e.g., for processing by the mapping platform 103), related geographic data, etc. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture ground control point imagery, etc. for analysis), an audio recorder for gathering audio data, velocity sensors mounted on steering wheels of the vehicles, switch sensors for determining whether one or more vehicle switches are engaged, and the like.

Other examples of sensors of the UE 107 and/or vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the UE 107 and/or vehicle 101 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 107 and/or vehicle 101 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 121 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 103, machine learning system 119, computer vision system 117, services platform 113, services 115, UE 107, vehicle 101, and/or content providers 125 communicate with each other and other components of the system 100 using well known, new or still developing protocols. In this context, a protocol includes a set of rules defining how the network nodes within the communication network 121 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 7:
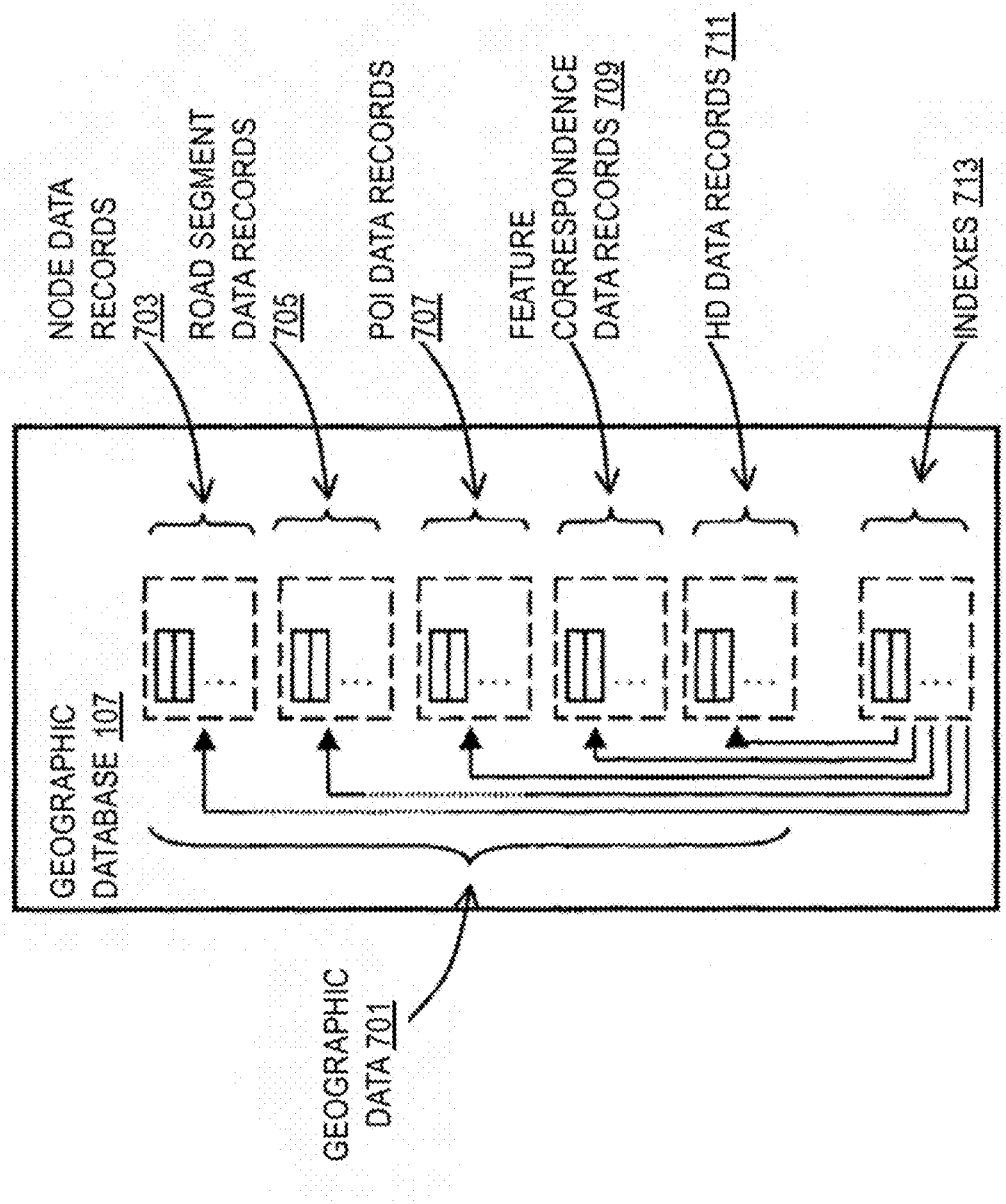
FIG. 7 is a diagram of a geographic database, according to one embodiment.

FIG. 7 is a diagram of a geographic database, according to one embodiment. In one embodiment, the geographic database 123 includes geographic data 701 used for (or configured to be compiled to be used for) mapping and/or navigation-related services, such as for video odometry based on the mapped features (e.g., lane lines, road markings, signs, etc.). In one embodiment, the geographic database 123 includes high resolution or high definition (HD) mapping data that provide centimeter-level or better accuracy of map features. For example, the geographic database 123 can be based on Light Detection and Ranging (LiDAR) or equivalent technology to collect billions of 3D points and model road surfaces and other map features down to the number lanes and their widths. In one embodiment, the HD mapping data (e.g., HD data records 711) capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 123.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 123 follows certain conventions. For example, links do not cross themselves and do not cross each other except at a node. Also, there are no duplicated shape points, nodes, or links. Two links that connect each other have a common node. In the geographic database 123, overlapping geographic features are represented by overlapping polygons. When polygons overlap, the boundary of one polygon crosses the boundary of the other polygon. In the geographic database 123, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 123 includes node data records 703, road segment or link data records 705, POI data records 707, feature correspondence data records 709, HD mapping data records 711, and indexes 713, for example. More, fewer or different data records can be provided. In one embodiment, additional data records (not shown) can include cartographic ("carto") data records, routing data, and maneuver data. In one embodiment, the indexes 713 may improve the speed of data retrieval operations in the geographic database 123. In one embodiment, the indexes 713 may be used to quickly locate data without having to search every row in the geographic database 123 every time it is accessed. For example, in one embodiment, the indexes 713 can be a spatial index of the polygon points associated with stored feature polygons.

In exemplary embodiments, the road segment data records 705 are links or segments representing roads, streets, or paths, as can be used in the calculated route or recorded route information for determination of one or more personalized routes. The node data records 703 are end points corresponding to the respective links or segments of the road segment data records 705. The road link data records 705 and the node data records 703 represent a road network, such as used by vehicles, cars, and/or other entities. Alternatively, the geographic database 123 can contain path segment and node data records or other data that represent pedestrian paths or areas in addition to or instead of the vehicle road record data, for example.

The road/link segments and nodes can be associated with attributes, such as functional class, a road elevation, a speed category, a presence or absence of road features, geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 123 can include data about the POIs and their respective locations in the POI data records 707. The geographic database 123 can also include data about places, such as cities, towns, or other communities, and other geographic features, such as bodies of water, mountain ranges, etc. Such place or feature data can be part of the POI data records 707 or can be associated with POIs or POI data records 707 (such as a data point used for displaying or representing a position of a city).

In one embodiment, the geographic database 123 can also include feature correspondence data records 709 for storing the identified feature correspondences (e.g., image-to-image correspondences, image-to-ground correspondences, etc.), camera geometry parameters, location corrected images, location corrected features, location corrected camera models/poses, as well as other related data used or generated according to the various embodiments described herein. By way of example, the feature correspondence data records 709 can be associated with one or more of the node records 703, road segment records 705, and/or POI data records 707 to support localization or visual odometry based on the features stored therein and the corresponding estimated quality of the features. In this way, the records 709 can also be associated with or used to classify the characteristics or metadata of the corresponding records 703, 705, and/or 707.

In one embodiment, as discussed above, the HD mapping data records 711 model road surfaces and other map features to centimeter-level or better accuracy. The HD mapping data records 711 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 711 are divided into spatial partitions of varying sizes to provide HD mapping data to vehicles 101 and other end user devices with near real-time speed without overloading the available resources of the vehicles 101 and/or devices (e.g., computational, memory, bandwidth, etc. resources).

In one embodiment, the HD mapping data records 711 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 711.

In one embodiment, the HD mapping data records 711 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 123 can be maintained by the content provider 125 in association with the services platform 113 (e.g., a map developer). The map developer can collect geographic data to generate and enhance the geographic database 123. There can be different ways used by the map developer to collect data. These ways can include obtaining data from other sources, such as municipalities or respective geographic authorities. In addition, the map developer can employ field personnel to travel by vehicle (e.g., vehicle 101 and/or UE 107) along roads throughout the geographic region to observe features and/or record information about them, for example. Also, remote sensing, such as aerial or satellite photography, can be used.

The geographic database 123 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or UE 107, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing feature correspondence based on different image views may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
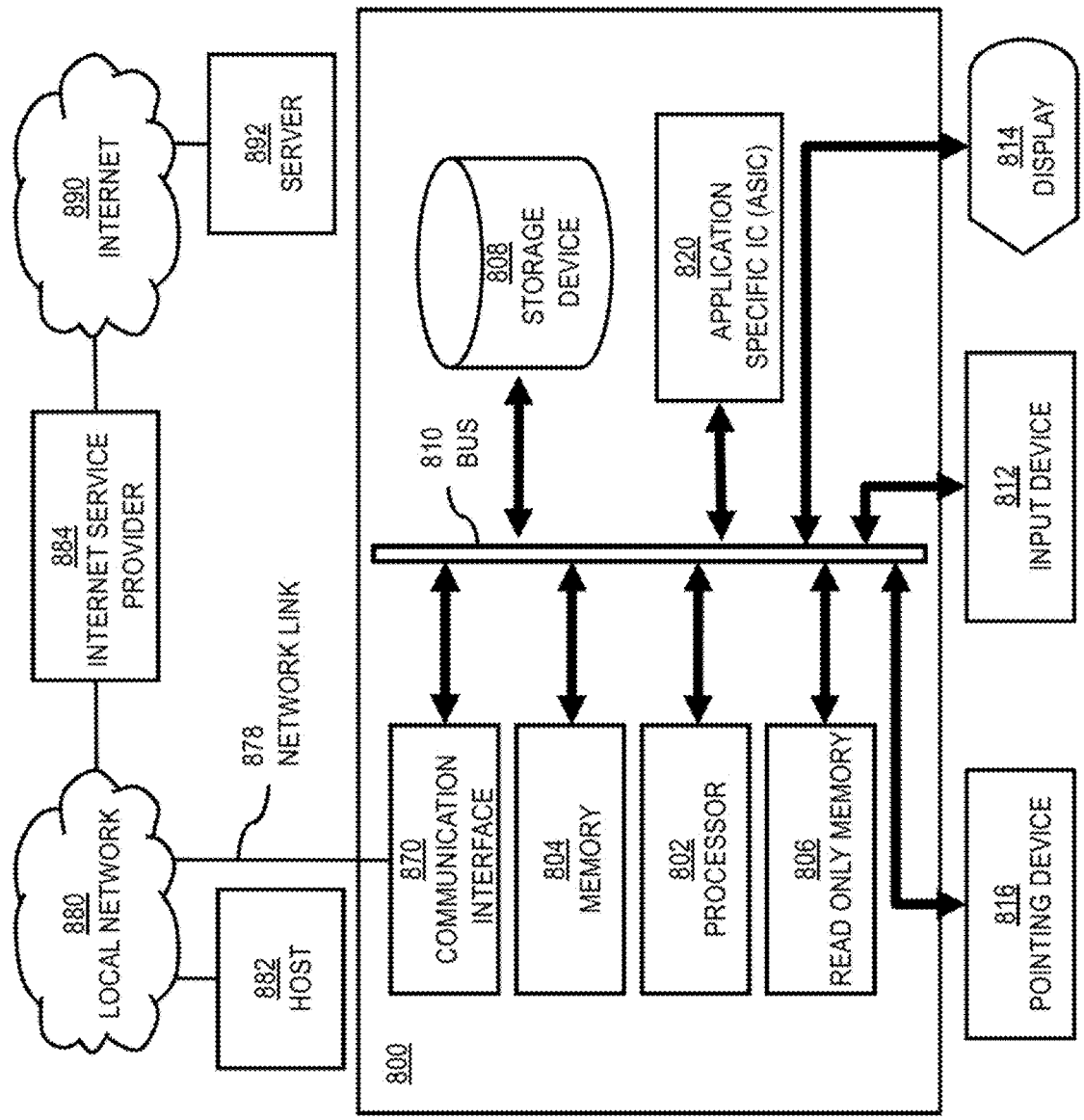
FIG. 8 is a diagram of hardware that can be used to implement an embodiment.

FIG. 8 illustrates a computer system 800 upon which an embodiment of the invention may be implemented. Computer system 800 is programmed (e.g., via computer program code or instructions) to provide feature correspondence based on different image views as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to provide feature correspondence based on different image views. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for providing feature correspondence based on different image views. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing feature correspondence based on different image views, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 121 for providing feature correspondence based on different image views.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 9 illustrates a chip set 900 upon which an embodiment of the invention may be implemented. Chip set 900 is programmed to provide feature correspondence based on different image views as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide feature correspondence based on different image views. The memory 905 also stores the data associated with or generated by the execution of the inventive steps.

Figure 10:
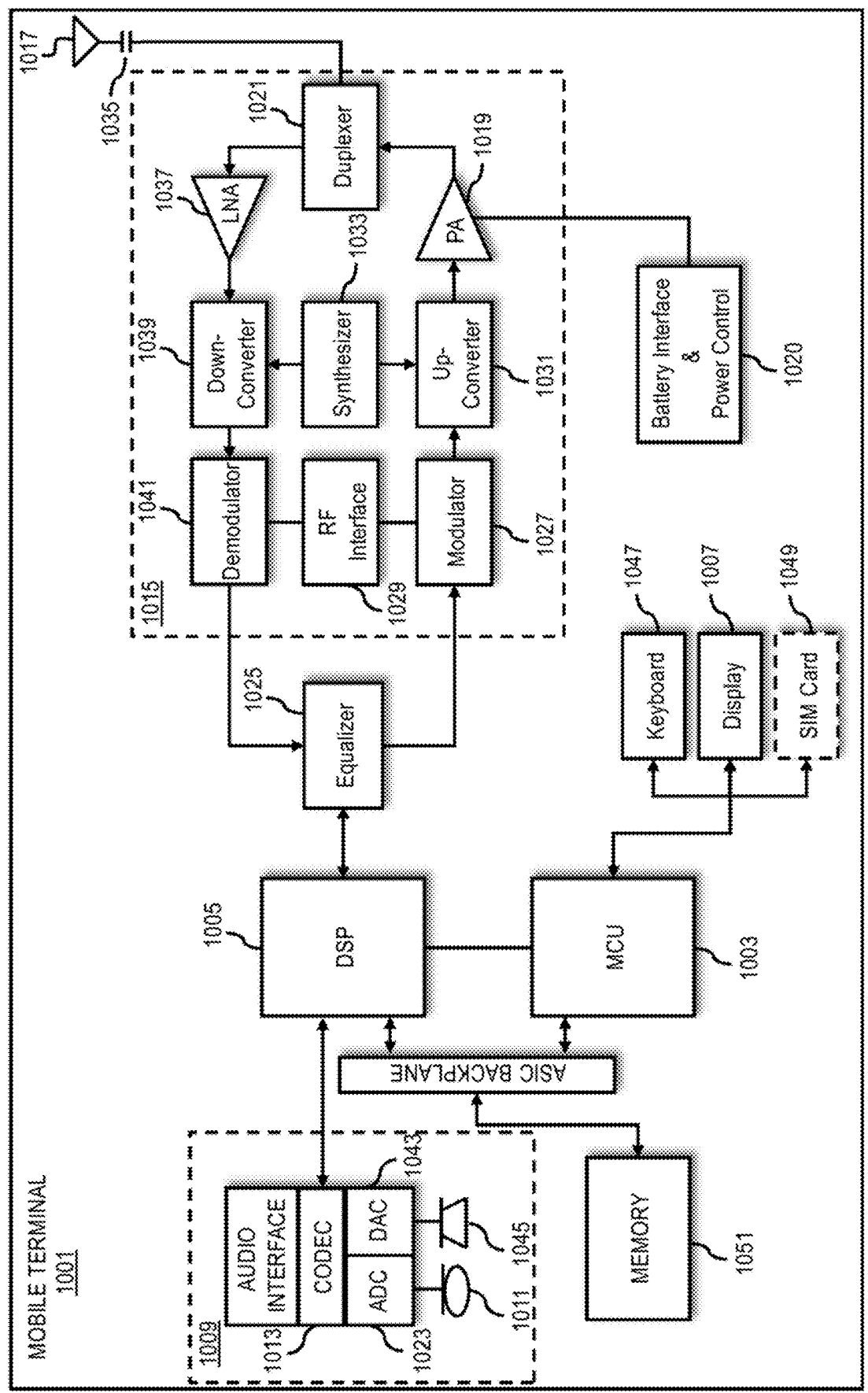
FIG. 10 is a diagram of a mobile terminal (e.g., handset, vehicle, or component thereof) that can be used to implement an embodiment.

FIG. 10 is a diagram of exemplary components of a mobile terminal (e.g., vehicle 101, UE 107, or component thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions that offer automatic contact matching. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile station 1001 to provide feature correspondence based on different image views. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1051 may be, but not limited to, a single memory, CD, DVD, ROM, RAM, EEPROM, optical storage, or any other non-volatile or non-transitory storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for determining a feature correspondence between a first image and a second image based on camera geometry comprising:
    determining a first labeled or detected pixel location in the first image and a second labeled or detected pixel location in the second image;
    computing a first ray from a first camera position of the first image through the first labeled or detected pixel location;
    computing a second ray from a second camera position of the second image through the second labeled or detected pixel location;
    computing a closeness value of the first ray and the second ray; and
    providing an output indicating the feature correspondence between the first labeled or detected pixel location and the second labeled or detected pixel location based on determining that the closeness value is within a threshold value.

2. The method of claim 1, wherein the closeness value is determined by computing a length of a line segment between the first ray and the second ray.

3. The method of claim 2, wherein the line segment is orthogonal to both the first ray and the second ray.

4. The method of claim 1, further comprising:
providing another output indicating that first labeled or detected pixel location, the second labeled or detected pixel location, or a combination thereof has no correspondence based on determining that the closeness value exceeds the threshold value.

5. The method of claim 1, further comprising:
initiating an iterative computation of a subsequent closeness value between each subsequent ray pair computed between each subsequent first labeled or detected pixel location in the first image and each subsequent second labeled or detected pixel location in the second image.

6. The method of claim 5, wherein the iterative computation is stopped based on determining that there is no more of said each subsequent first labeled or detected pixel location in the first image, there is no more of said each subsequent second labeled or detected pixel location in the second image, or a combination thereof.

7. The method of claim 1, wherein the first labeled or detected pixel location is a first real-world location computed based on the first camera position, and wherein the second labeled or detected pixel location is a second real-world location computed based on the second camera position.

8. The method of claim 1, wherein the output indicating the feature correspondence is used for at least one of:
a triangulation of a map feature for map making;
a real-time sensing of an environmental obstacle;
a determination of driver road behavior;
a determination of a safe or drivable map area;
an estimation of motion or depth; and
an image stitching.

9. An apparatus for determining a feature correspondence between a first image and a second image based on camera geometry comprising:
at least one processor; and
at least one memory including computer program code for one or more programs,
the at least one memory and the computer program code configured to, with the at least one processor, cause the apparatus to perform at least the following,
determine a first labeled or detected pixel location in the first image and a second labeled or detected pixel location in the second image;
compute a first ray from a first camera position of the first image through the first labeled or detected pixel location;
compute a second ray from a second camera position of the second image through the second labeled or detected pixel location;
compute a closeness value of the first ray and the second ray; and
provide an output indicating the feature correspondence between the first labeled or detected pixel location and the second labeled or detected pixel location based on determining that the closeness value is within a threshold value.

10. The apparatus of claim 9, wherein the closeness value is determined by computing a length of a line segment between the first ray and the second ray.

11. The apparatus of claim 10, wherein the line segment is orthogonal to both the first ray and the second ray.

12. The apparatus of claim 9, wherein the apparatus is further caused to:
provide another output indicating that first labeled or detected pixel location, the second labeled or detected pixel location, or a combination thereof has no correspondence based on determining that the closeness value exceeds the threshold value.

13. The apparatus of claim 9, wherein the apparatus is further caused to:
initiate an iterative computation of a subsequent closeness value between each subsequent ray pair compute between each subsequent first labeled or detected pixel location in the first image and each subsequent second labeled or detected pixel location in the second image.

14. The apparatus of claim 13, wherein the iterative computation is stopped based on determining that there is no more of said each subsequent first labeled or detected pixel location in the first image, there is no more of said each subsequent second labeled or detected pixel location in the second image, or a combination thereof.

15. A non-transitory computer-readable storage medium for determining a feature correspondence between a first image and a second image based on camera geometry, carrying one or more sequences of one or more instructions which, when executed by one or more processors, cause an apparatus to perform:
determining a first labeled or detected pixel location in the first image and a second labeled or detected pixel location in the second image;
computing a first ray from a first camera position of the first image through the first labeled or detected pixel location;
computing a second ray from a second camera position of the second image through the second labeled or detected pixel location;
computing a closeness value of the first ray and the second ray; and
providing an output indicating the feature correspondence between the first labeled or detected pixel location and the second labeled or detected pixel location based on determining that the closeness value is within a threshold value.

16. The non-transitory computer-readable storage medium of claim 15, wherein the closeness value is determined by computing a length of a line segment between the first ray and the second ray.

17. The non-transitory computer-readable storage medium of claim 16, wherein the line segment is orthogonal to both the first ray and the second ray.

18. The non-transitory computer-readable storage medium of claim 15, wherein the apparatus is caused to further perform:
providing another output indicating that first labeled or detected pixel location, the second labeled or detected pixel location, or a combination thereof has no correspondence based on determining that the closeness value exceeds the threshold value.

19. The non-transitory computer-readable storage medium of claim 15, wherein the apparatus is caused to further perform:
initiating an iterative computation of a subsequent closeness value between each subsequent ray pair compute between each subsequent first labeled or detected pixel location in the first image and each subsequent second labeled or detected pixel location in the second image.

20. The non-transitory computer-readable storage medium of claim 19, wherein the iterative computation is stopped based on determining that there is no more of said each subsequent first labeled or detected pixel location in the first image, there is no more of said each subsequent second labeled or detected pixel location in the second image, or a combination thereof.

* * * * *